United States Patent [19]

Remberg et al.

[11] 4,186,495
[45] Feb. 5, 1980

[54] APPARATUS FOR FREEZE DRYING OF GAS, ESPECIALLY COMPRESSED AIR

[76] Inventors: Horst Remberg, Berliner Str. 5, 4043 Holzheim; Werner Frischmann, Wilhelmshöhe 37a, 5810 Witten-Stockum, both of Fed. Rep. of Germany

[21] Appl. No.: 856,109

[22] Filed: Nov. 30, 1977

[30] Foreign Application Priority Data

| | | |
|---|---|---|
| Nov. 30, 1976 [DE] | Fed. Rep. of Germany | 2654253 |
| Dec. 14, 1976 [DE] | Fed. Rep. of Germany | 2656483 |
| Dec. 21, 1976 [DE] | Fed. Rep. of Germany | 2657858 |
| Jan. 12, 1977 [DE] | Fed. Rep. of Germany | 2701006 |

[51] Int. Cl.² ............................................. F26B 13/30
[52] U.S. Cl. ......................................... 34/92; 165/178
[58] Field of Search .................. 34/5, 92; 165/178; 29/159.3 R

[56] References Cited

U.S. PATENT DOCUMENTS

| | | | |
|---|---|---|---|
| 2,978,880 | 4/1961 | Berkeley | 34/92 |
| 3,134,432 | 5/1964 | Means | 165/178 |
| 3,636,607 | 1/1972 | De Marco | 29/157.3 R |
| 3,899,023 | 8/1975 | Zander et al. | 165/178 |
| 4,027,729 | 6/1977 | Bruhl | 165/111 |
| 4,095,648 | 6/1978 | Shipes | 165/178 |

Primary Examiner—John J. Camby
Attorney, Agent, or Firm—Staas & Halsey

[57] ABSTRACT

In apparatus for freeze drying of gas, particularly compressed air, with a gas to gas heat exchanger and a gas to refrigerant heat exchanger in a substantially vertical arrangement, the gas to be dried flowing successively through the gas to gas heat exchanger, the gas to refrigerant exchanger and then again through the gas to gas heat exchanger in a continuous circuit, at least the gas to gas heat exchanger has exchanger elements which consist of an outer pipe and an inner or core pipe located therein, and a metal sheet meander-shaped in cross-section is arranged in the space intermediate the inner surface of the outer pipe and the outer surface of the core pipe, and/or located in the core pipe, and is in heat contact with the surface or surfaces.

50 Claims, 25 Drawing Figures

APPARATUS FOR FREEZE DRYING OF GAS, ESPECIALLY COMPRESSED AIR

The invention relates to apparatus for the freeze drying of gas, particularly compressed air, with a gas to gas heat exchanger and a gas to refrigerant heat exchanger in a substantially vertical arrangement, the gas to be dried passing successively through the gas to gas exchanger, the gas to refrigerant heat flowing exchanger and finally again through the gas to gas heat exchanger in a continuous circulation.

Such an arrangement is known from the Applicants' prior U.S. Pat. No. 3,899,023 (British Pat. No. 1,419,705). The freeze drier described in this publication advantageously operates according to the counterflow principle, thus achieving a considerable saving in energy. The gas to be dried, particularly compressed air, is firstly introduced by the compressor into a gas to gas exchanger, where a part of the heat is withdrawn from the introduced gas or compressed air. The gas then flows from this gas to gas exchanger to a gas to refrigerant exchanger, where the dew point of the gas to be dried is lowered until the moisture contained and also in part other impurities are separated out. After separation of the moisture the gas is again fed in counterflow to the gas to gas heat exchanger, in order to warm up again the gas which is now dry, and at the same time in doing so to freeze the introduced gas which is still moist.

In comparison with previously-known arrangements, this freeze-drying apparatus known from our aforementioned patent, is characterised in that use is made of the natural gradient of the air in its various temperature conditions, thus achieving a considerable reduction in the otherwise usual pressure loss. The natural gradient results from the fact that the warm air first introduced into the freeze drier can flow downwards as it is cooled, which therefore corresponds to its natural gradient, as gas is liquified as it is cooled. A similar flow direction from above downwardly is also provided in the gas to refrigerant exchanger, so that here also the gas flows through heat exchanger along its natural gradient. As it is warmed up again in the gas to gas heat exchanger, the gas flows on the contrary upwards, which also corresponds to the natural requirement of the gas being warmed up and thus becoming lighter. The downward movement of the gas, which is cooling down and still laden with impurities, downwardly through the heat exchanger, is therefore also of advantage because in this way not only the separated moisture, but any dirt and oil residues possibly contained therein can collect at the bottom and be easily removed.

Figure 1:
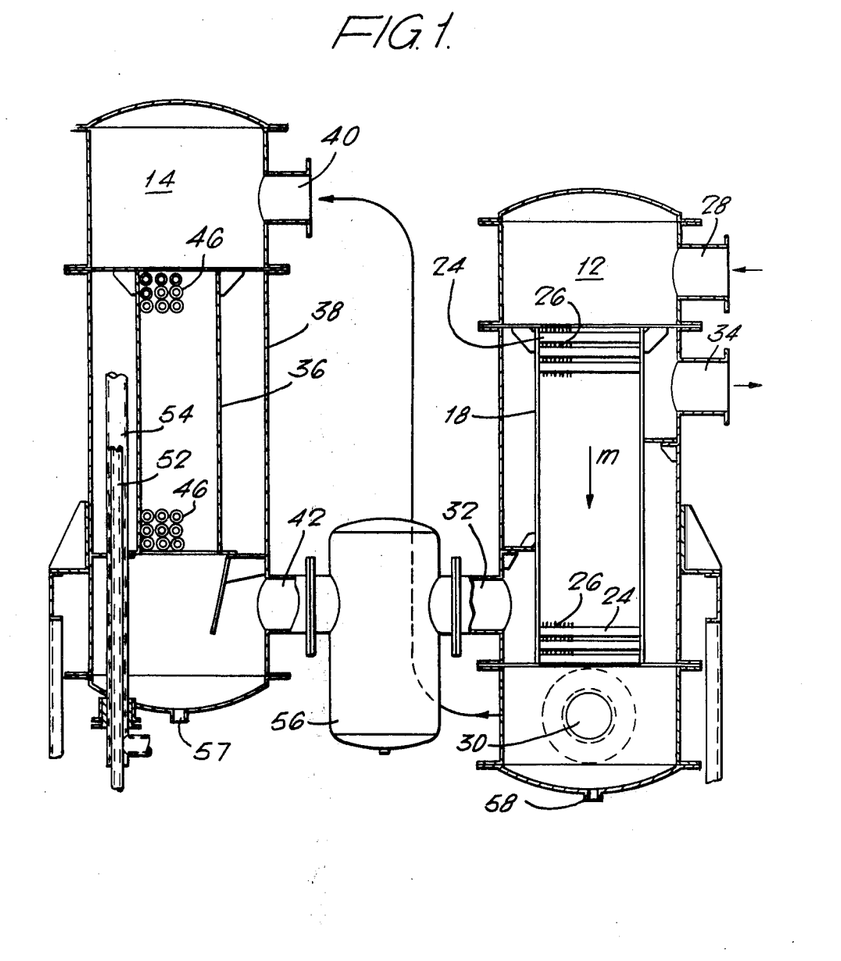
FIG. 1 is a partial sectional view of an apparatus for freeze drying of a gas, according to the prior art.

The apparatus known from our aforementioned patent and shown in FIG. 1, has moreover a filter arrangement located between the two exchangers, in order to ensure still better removal of dirt, oil residues and the like.

Figures 2, 3:
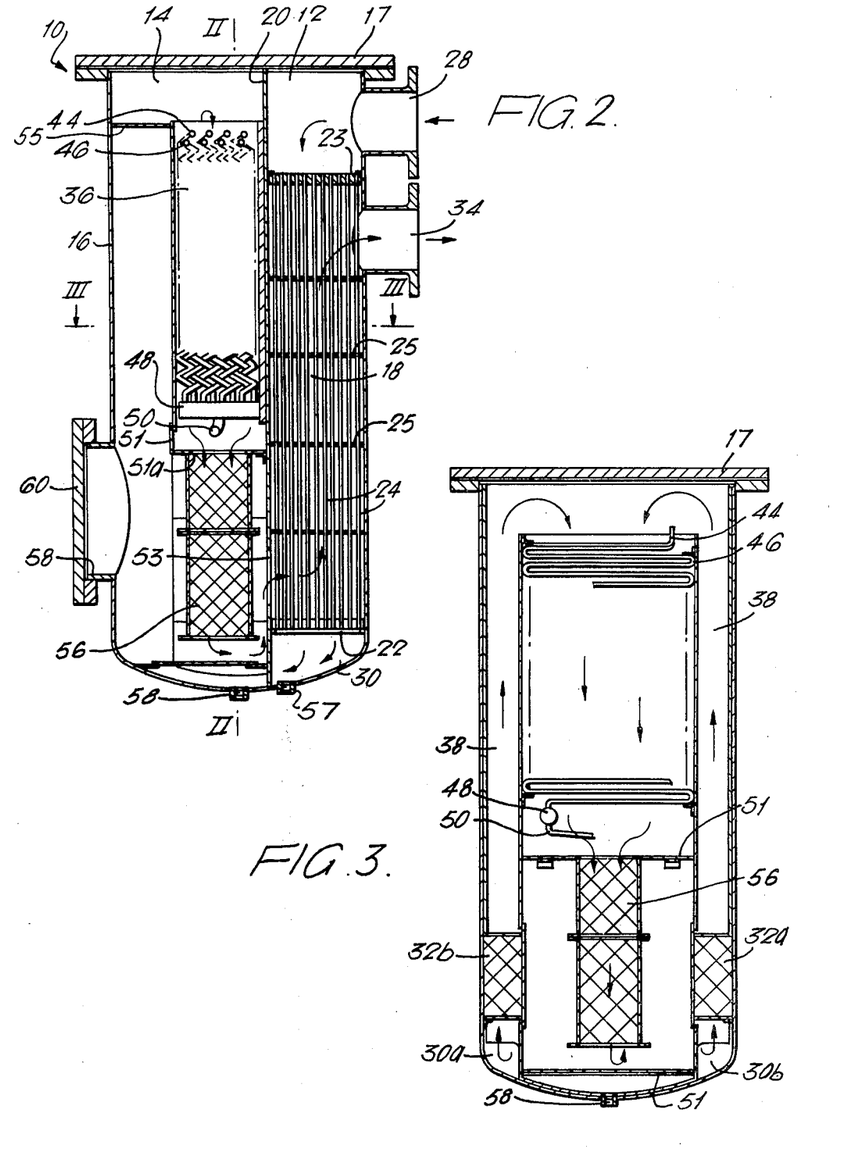
FIGS. 2 and 3 are two sectional views of another known apparatus for freeze drying of a gas.

An arrangement is also already known in which these two heat exchangers including the additional filter positioned therebetween are combined into a compact unit, e.f. our U.S. Pat. No. 4,027,729 and British Pat. No. 1,438,230, FIGS. 2 and 3 illustrating this other known construction.

These two constructions have indeed the disadvantage of a very considerable overall height resulting from the vertical arrangement of the two heat exchangers, which even renders it necessary, in the case of the freeze drier in our patent first aforementioned, to arrange the two heat exchangers side by side as separate units, which means additional requirement in floor space for the setting up of the drier.

A further disadvantage of the known arrangements resides in the fact that extremely long pipes are required in order to provide sufficiently large heat-exchange surface areas and these can be accommodated in the tank only by arranging them substantially horizontally within the heat exchanger tank, for example as condensing pipes in parallel or in zig-zag or spiral formation. A disadvantage of this substantially horizontal arrangement is that dirt particles are easily deposited in the condensing pipes at low throughflow speeds.

In the context of vertically-mounted freeze driers there has also already become known a heat-exchanger element in which a second pipe (core pipe) is inserted into a first pipe, the internal diameter of the first or external pipe being greater than the external diameter of the core pipe, so that there is an annular clearance which serves for through-passage of one exchanger medium, while the interior of the core pipe conveys the second exchanger medium. As in this case also a very considerable length is required for an exchanger element in order to obtain sufficient exchanger surface areas, these heat-exchanger pipe elements were also arranged either in zig-zag or spiral formation, the spiral type of construction, the so-called cyclone construction, having certain advantages in that in this case the risk of dirt deposits is somewhat less, as no sharp bends are involved.

If the arrangement of a pipe with a core pipe inserted therein is practical, nevertheless it has the disadvantage that on bending of the pipe combination there may easily occur a shift of the axis of the core pipe relative to that of the surrounding pipe, so that, for example, part of the external wall surface of the core pipe lies against a part of the internal wall surface of the surrounding pipe. As a result the clearance between the pipes becomes narrow from time to time in the direction of flow, and even very fine dirt may very easily settle therein, whereby there is not only the risk of an obstruction but there is a reduction in the surface area over which the heat-exchange medium is in contact with the pipe wall. This can seriously effect the efficiency, and in addition there is an increased pressure loss. Moreover, manufacture of a spiral or zig-zag shaped condensing pipe with an inserted core pipe is a very expensive technical operation.

An object of the invention is, on the one hand, while retaining the advantages of the arrangement according to our prior patent first aforementioned, namely very efficient use of energy through the counterflow principle and making the most of the natural gradient to reduce pressure losses, to produce a freeze drier, which is substantially more compact and in which the risk of blockage of the condensing pipes and the thereby entailed increased pressure losses and impaired efficiency are avoided.

A further object of the invention is to achieve an improvement in the arrangement known from our prior patent second aforementioned by reducing the pressure drop in the gas circuit, by making more accessible the filter devices available in this apparatus and by making their replacement less frequent, and by having the device more easily susceptible to development of its nominal capacity or capable of optimum adaptation to the output actually required. The construction known from our patent second aforementioned is of course more compact than the freeze drier of our patent first aforementioned, but the necessity for three filters and the presence of numerous reverse turns involves a very considerable pressure drop in the gas circuit. In addition, the filters in this construction, which require to be changed relatively often, are rather difficult of access. In addition, this drier uses a pressure tank into which individual drying elements must be inserted. However, the normal output required of the drier is also determined by the size of the pressure tank, i.e. it can no longer be developed, for example in the way of increased performance.

The feature that the whole arrangement must be housed in a pressure tank leads to the situation that, depending on the pressure of the gas to be passed through, there arise extremely high values for the so-called "pressure-liter product" (pressure of the gas in the tank in bars, multiplied by the tank volume in liters). With increasing pressure-liter product, however, the safety requirements also become more stringent. In the Federal German Republic, for a pressure-liter product of more than 200 liter/bars, acceptance by the Technical Supervisory Association is necessary. In the case of a pressure-liter product lying above 1000 liter/bars, moreover, examination by the Technical Supervisory Association at four-yearly intervals is prescribed. These prescribed acceptances cause delays in manufacture and increase manufacturing costs. The regular examination involves charges and also requires stoppage of the entire plant, which can be extremely troublesome in many cases. Despite these prescribed examinations, the danger of a tank bursting under extremely high pressure because of fatigue of material or accidents, can never be totally excluded and may lead to considerable destruction of material and also to injuries to operating personnel.

Accordingly, a further object of the present invention is to provide a freeze drier in which either a pressure tank is entirely eliminated, or which has a considerably reduced pressure-liter product.

The use of tanks into which heat-exchanger units are inserted, as is the case with the prior art, has the already-mentioned disadvantage that the sizes of the tanks determine the maximum possible output of the cold freeze drier. Adaptation to higher outputs is therefore not possible. On the contrary, it would be necessary to connect several freeze driers of the known art in parallel, which however is unsuitable for reasons of space and cost.

Even adaptation downwards in the case of the known freeze drier seems of little significance, as on the one hand the external dimensions would not in any way be changed, unless an entirely new construction is made, and on the other hand a reduction in plant costs is scarcely to be expected, as essential parts of the drying apparatus must be taken over unchanged even with lower rated output requirements.

Adaptation to the required throughput capacity, either during manufacture of the freeze drier, or by alteration of an already-existing freeze drier, is of considerable advantage in many cases. If the throoughput capacity requirements increase in the course of time, it has hitherto been necessary with the employment of the traditional freeze driers, either to provide additional freeze driers, or to replace the previous freeze drier of lower capacity by a new freeze drier of higher capacity.

Not only is the extensibility of the freeze drier important, however, but also the possibility of being able to undertake during manufacturing an adaptation as precise as possible of the throughput capacity of the freeze drier to the specific desiderata of the customer. On the one hand, a saving in space can be achieved thereby, and on the other hand, there would even be a reduction in the cost of the apparatus, if a smaller exchange surface area is required, than would normally be provided.

It would also be desirable to be able to offer a series of freeze driers of different output, the model and price of which are in accord with the actual rated output, it being particularly advantageous if as few as possible different structural elements were necessary for the different sizes of freeze drier.

It is therefore yet another object of the invention to provide a freeze drier which is so constructed that it enables adaptation to a required output without great expense, and is also extensible in the way of higher throughput capacity without large costs.

The objects according to the invention, especially that first mentioned, are achieved by at least the gas to gas heat exchanger having heat-exchanger elements consisting of an outer pipe and an inner or core pipe located therein, a metal sheet meander-shaped in cross-sectional view extending in the space intermediate the inner surface of the outer pipe and the outer surface of the core pipe, and/or located in the core pipe, and being in heat contact with the surface or surfaces.

This arrangement not only avoids contact between the core pipe or tube and the inner surface of the outer pipe or tube resulting from unskilful handling during manufacture or assembly, which would lead to dirt-collection points, but also such a large increase in heat-exchange capacity is achieved that the overall length of the exchanger element no longer need be bent in a zig-zag or looped shape, in order to be able to house it in the heat-exchange tank. Rather, the entire exchanger tube or pipe length may be housed in the over-all vertical height of the exchanger tank. Thus the manufacture of the spiral condensing tubes or pipes is considerably simplified, and the throughflow resistance is considerably reduced, as the flowing gas does not require to overcome sharp curves. The lines of contact between the tube surfaces and the meandering sheet metal always lie in the flow direction of the heat-exchanging medium, so that the risk of dirt deposits is considerably lessened.

Instead of arranging the exchanger elements substantially vertically, it may be appropriate in certain applications to provide a slight twist (0.2 . . . 2 turns per meter, or even 0.5 . . . 1 turns per meter difference of level), particularly when a certain degree of turbulence is desirable in the gas. This twisting does not alter the basic fact that sharp corners are avoided and a continuous downward movement of the gas to be cooled (or upward movement of the gas to be warmed) is ensured.

Because of the poorer heat-transfer between gas and metal compared to the heat-transfer from refrigerant to metal, the ribbing consisting of meander-shaped sheet metal is of advantage, particularly in the gas circuit, while under certain circumstances it may be omitted in the refrigerant circuit. Such an optimal adaptation to the heat exchanger media can considerably reduce manufacturing costs.

As a result of the heat-exchange elements formed according to the invention, it is possible to construct the arrangement shown in our prior patent first aforementioned of vertically-adjacent gas to gas heat exchanger and gas to refrigerant heat exchanger in such a way that the whole apparatus is considerably more compact, e.g. by reduction in the required ground areas, and/or by reduction in the over-all height. The known arrangement is particularly suitable for large drier installations (e.g. from 5,000 m³/hr upwards). For smaller-capacity driers (e.g. from 60 to 5,000 m³/hr), even greater compactness may be achieved by locating the gas to refrigerant heat exchanger and gas to gas heat exchanger coaxially relative to one another. This may, for example, be effected by having the gas to gas heat exchanger above the gas to refrigerant heat exchanger, or by having the gas to refrigerant heat exchanger located within the gas to gas heat exchanger.

As the heat-transfer within the gas to refrigerant heat exchanger is more favourable, the heat-exchanger elements used at this point may be kept shorter, so that the overall height of the gas to refrigerant heat exchanger is less than that of the gas to gas heat exchanger. Instead of this, however, the ribs of the gas to refrigerant heat exchanger may be less in number, or may be provided with a smaller surface area, than the ribs of the gas to gas heat exchanger, particularly when, for standardisation purposes, the same heights are selected for both units. In this case, instead of a reduced over-all height, a reduction of manufacturing costs is achieved.

It is appropriate for purposes of higher air throughput to locate several exchanger elements adjacent to one another in each heat-exchanger. Particularly in the case of coaxial arrangement of the gas to refrigerant heat exchanger within the gas to gas heat exchanger, it is suitable to locate the axes of the exchanger elements within a continuously-extending closed curve, this curve in many cases representing a circle.

Instead of constructing the exchanger element from a core tube and an external tube with an associated corrugated ribbed metal sheet, it may be advantageous under certain circumstances to provide several core tubes or pipes within one outer tube or pipe, corrugated sheet metal being disposed around each core tube or pipe. The corrugated metal may either be located symmetrically around the core tube, or may be compressed together in such a way that substantially no free space is left in the lumen of the outer tube. Likewise, corrugated metal may be introduced into the individual core tubes, particularly when the medium flowing through the core tubes is gaseous.

The present invention also relates to method of manufacturing heat-exchange elements of the aforementioned type. On the one hand, the manufacturing method according to the invention consists firstly in encasing a core tube by corrugated sheet metal, and thereafter inserting the encased core tube into an outer tube. Instead of inserting only one core tube into the outer tube, several encased core tubes may be inserted into a suitably larger outer tube. Under certain circumstances it is advantageous also to insert corrugated metal into the core tube.

Under certain operational conditions it can be advantageous to provide a connection between the corrugated metal and the tube jacket, for example by soldering or welding. It is even more desirable if, instead of this, after insertion of the corrugated tube, the diameter of the tube is reduced by drawing, thus achieving clamping and further folding of the corrugated metal. By means of this type of manufacture, it is in particular possible, when several core tubes are located in one larger outer tube, to have the lumen of the outer tube entirely filled with corrugated metal, so that the heat-transfer resistance from the individual metal parts to the tube jackets is reduced, and thus heat-transfer is simplified.

It may be favourable to impart a slight twist to the corrugated metal, thus subjecting the medium passing through to a spiral movement, which is of advantage in many applications.

The corrugated metal may be made from a sheet-metal strip, which is provided with its corrugations and then bent around a bar, in order to insert it into the core tube, or in order to pass it around the core tube. Another possible method is to provide a tube with recesses in such a way that the desired form of corrugated metal results, this raw material being of special advantage if the corrugated metal is subsequently pressed by deep-drawing of the surrounding tube.

Another embodiment of the invention, which in particular fulfils the second purpose mentioned, is characterised in that the gas to gas heat exchanger and the gas to refrigerant heat exchanger form a column with a flue-like space disposed in the centre of the column, the upper end of this flue being occupied by the filter.

This arrangement enables optimal adaptation of the drier by a suitable modular construction of the column, to the nominal capacity requirement at any moment, and in particular adaptation to larger nominal capacities is possible without difficulty. A further advantage is that only one more filter is required, and the complicated gas turning points still present in the prior art represented by our prior patent second aforementioned are partially eliminated, so that reduction in the pressure drop in the gas circuit is achieved. The arrangement of the filter at the upper end of the column also makes it considerably more accessible than was previously the case. The provision of the flue makes it possible to separate a large proportion of the oil droplets carried along with the compressed air in the region of the flue, so that on the one hand only one filter is required, and on the other hand this filter need be changed much less frequently. The flue is of very high efficiency when the load applied to the freeze drier removes the compressed air in a pulsating fashion, as, during the pauses in withdrawal, oil droplets have an opportunity to drop downwards in the air which is then stationary in the flue.

The load on the filter is reduced, and thus its renewal is less often necessary, if there is provided at the lower end of the flue a baffle separator, to which the gas emerging from the gas to refrigerant heat exchanger is fed. Thus at the lower end of the flue a large proportion of the carried oil is already separated.

According to yet another embodiment of the invention, there is upstream of the baffle separator a cyclone separator which further improves the oil separation. The oil-separating effect of the flue is improved if, in a yet further development of the invention, the two heat exchangers are located coaxially one above the other, the lower part of the flue being formed by the gas to refrigerant heat exchanger and the upper part by the gas to gas heat exchanger.

In order to avoid disadvantageous return pipes, which impair the flow resistance characteristics, it is also advantageous to provide in the compass of the gas to gas heat exchanger, between the flue outer wall and the exchanger inner wall, a space for return of the gas emerging from the filter to the return inlet of the gas to gas heat exchanger.

Instead of locating the two exchangers one above the other, it may be appropriate for spatial reasons to locate the gas to refrigerant heat exchanger coaxially within the gas to gas heat exchanger, the inner wall of the former then forming the flue. Here also the shortened flow path for the gas is of advantage, as this often likewise reduces the pressure drop.

In such a construction it is appropriate to form around the gas to refrigerant heat exchanger a space serving for return of the gas emerging from the filter to the return flow inlet of the gas to refrigerant heat exchanger.

The use of individual exchanger elements serves to adapt the freeze drier to determined power requirements. In this case it is of particular advantage structurally if the ends of the flue or separator inlet and filter outlet are in communication with these individual elements of the heat-exchanger by way of annular spaces.

Servicing the filters is simplified if, according to yet another embodiment of the invention, the filter comprises a filter cartridge insertable from above into the filter space.

In order to enable the flow speed of the gas within the flue to be adapted to the system capacity of the freeze drier at any moment, it is appropriate according to yet another embodiment of the invention if the flue is formed by a separate tube disposed within the inner walls of the exchanger, because then the flow speed can be selected by corresponding adaptation of the tube diameter.

A further embodiment which in particular very well achieves the third-mentioned object, is characterised in that the gas to gas heat exchanger and the gas to refrigerant heat exchanger are disposed coaxially to one another, and are constructed from exchanger elements which have a tube-in-tube structure, and end in annular collector spaces of small cross-section.

This arrangement enables drastic reduction of the volume contained within the freeze drier and occupied by gas under pressure, so that either for the same throughput performance, the pressure-liter product can be considerably decreased, or, with a substantially unchanged pressure-liter product, an increase in the throughput performance is possible. In particular, the coaxial arrangement enables elimination of connecting pipes, and thus the volume contained by these pipes can be eliminated. In addition, through the tube-in-tube construction, with walls which are already relatively thin, considerable resistances to pressure can be achieved. The provision of annular connector spaces of small cross-section likewise reduces the required volume, and permits a construction making possible high resistances to pressure with extremely high economical use of materials.

According to an advantageous further development of the invention, the gas to refrigerant heat exchanger and the gas to gas heat exchanger are located one above the other in such a way that the inner tubes pass without interruption through both exchangers. In this way connecting pipes and connecting spaces are eliminated, and the pressure-volume product is further reduced. The volume required for a determined heat-exchange capacity for the compressed gas to be treated is reduced if several inner tubes lie in one outer tube, because in this way a larger heat-transfer surface area is provided within this outer tube, practically without enlargement of the outer tube which is under pressure.

In many cases it is also desirable to provide separators within the freeze drier. In this case, according to yet another embodiment of the invention, it is of advantage to have such a separator in tubular form located in the centre of the heat-exchanger. Here also the tubular shape makes possible resistance to pressure with relatively economical use of materials, and in addition the tube also has the advantage over differently-shaped spaces that a lesser increase in pressure-volume product results.

The overall volume of the drier can be reduced if, according to yet another embodiment of the invention, the two heat-exchangers are located one within the other. While retaining the tubular and annular construction which is favourable in terms of pressure-volume product, it is thus possible to make the external dimensions of the drier very small.

A further improvement can be achieved if the connection between the individual elements of the drier, such as annular spaces, separators, filters, inlet and outlet are formed by pipe lines.

It is particularly advantageous if these annular pipes have, like the heat-exchanger elements, a circular cross-section, as in this way with small wall thicknesses a high resistance to pressure is achieved. This applies to any existing separators and filters, which may be particularly suitably constructed as small pressure-vessels, the volume metric capacity of which is as small as possible.

The adaptability already discussed to a determined performance may be achieved in fulfilment of the fourth-mentioned object in an apparatus of the type initially mentioned for freeze drying of gas, by having the heat-exchangers respectively consist of several identical substantially vertical parallel-mounted exchanger elements, the axes of which lie on one closed curve or several closed curves coaxially with one another.

This basic construction enables selection of any number of exchanger elements in accordance with performance requirements, the cost of the exchanger elements forming the greater part of the cost of the drier, and enables optimal adaptation of manufacturing costs to the required performance. In addition it is possible without great difficulty subsequently to add further exchanger elements, in order thereby to adapt the rated output to increasing requirements.

The construction is rendered particularly simple if, according to an advantageous further development of the invention, the axes of gas to gas heat exchanger and the gas to refrigerant heat exchanger respectively lie on only one closed curve, for example on a circle.

In order further to simplify the construction and thus to simplify extension to higher performance, according to yet another embodiment of the invention, the gas to gas heat exchanger and the gas to refrigerant heat exchanger are located one above the other and at least some of the exchanger elements of the gas to gas heat exchanger lie coaxially with corresponding exchanger elements of the gas to refrigerant heat exchanger. By addition of only one exchanger element column, it is thus possible simultaneously to increase the throughput performance both in the gas to gas heat exchanger and also in the gas to refrigerant heat exchanger.

The required number of structural elements is further reduced if the exchanger elements lying respectively on an enclosed curve are spaced uniformly apart. This applies particularly if, according to yet a further development of the invention, the exchanger elements lying on a closed curve are connected at their ends respectively with two collector pipes, which are substantially in the shape of the closed curve, one collector pipe being provided for one exchanger medium, and the second pipe for the other medium, and if the said components form an exchanger module. The uniformity of spacings then makes possible the provision of similar components for the different collector pipes.

Interchangeability is further improved if the four collector pipes of the exchanger module each have a connecting nozzle by means of which a connection may be established to further modules, and/or separators, filters, inlets and outlets of the freeze drier.

Instead of locating the freeze driers one above the other, it may also be suitable, especially for reasons of compactness, to select the diameters of the closed curves of the modules in such a way that these may be located one within another.

Finally, it is also of advantage if, according to a further embodiment of the invention, the collector pipes are provided with fittings to which further exchanger elements may be attached, e.g. flanged on. In this way for example the extension of the installation is particularly simplified.

Further details, advantages and possible applications of the invention will become apparent from the accompanying illustrations of embodiments, and from the following description. In the drawings.

FIG. 1 shows a freezer drier 10 of a known type. It comprises a vertically-mounted gas to gas heat exchanger 12 and mounted parallel thereto, a gas to refrigerant heat exchanger 14. Within the gas to gas heat exchanger 12 there is located a heat exchanger insert 18, made up of horizontally disposed spiral condensing tubes or pipes 24, on the outer wall surfaces of which are cooling ribs 26.

The gas to be treated, coming for example from a compressor, and possibly already pre-cooled, is passed to the gas to gas heat exchanger 12 through an inlet 28, the compressed air temperature being, for example, 35° C. From the inlet, the compressed air flows over the condensing pipes or tubes and ribs 24, 26 in the direction of the arrow m from above downwards, and is thereby cooled.

The gas emerges at 30, and passes through a tube (not shown) to the inlet 40 of the gas to refrigerant heat exchanger 14.

The gas to refrigerant heat exchanger 14 likewise includes a heat-exchanger insert 36, surrounded by a casing 38. The gas flowing into the inlet 40, cooled to a temperature of for example 20° C., flows through the heat-exchanger insert 36, leaving it at a temperature of +1.5° C.

The moisture contained in the gas is precipitated by the drop in temperature and may be removed through outlets 57 and 58. The now dry gas passes at 42 out of the gas to refrigerant heat exchanger, and is passed to an optionally-provided filter 56, where any dirt residues and oil particles not precipitated with the water are trapped. The cold gas then passes from this filter again into the gas to gas heat exchanger 12, where it is passed from the inlet 32 to the condensing pipes or tubes 24, and upwards and out of the outlet 34. During this time the gas is warmed again to the temperature suitable for use.

This known freeze drier thus already uses the energy-saving return-flow principle and, by utilisation of the natural gradient of the variously-temperatured gas components, achieves a drop in the throughflow resistance. However, the horizontal arrangement of the spiral condensing pipes or tubes both in the gas to gas heat exchanger 12 and also in the gas to refrigerant heat exchanger 14 is disadvantageous, where the refrigerant passed through an injector pipe 52 flows through the condensing pipes or tubes 46 arranged in series, and through the suction pipe 54 again out of the heat-exchanger casing. Should dirt particles or foreign bodies be contained in the refrigerant, it is easy because of the horizontal arrangement of the condensing pipes or tubes for these foreign particles to be deposited on the lower parts of the pipes or tubes, thus in time narrowing the lumen of the pipe lines and on the one hand impairing the heat transfer to the tube wall, and on the other hand increasing the flow resistance for the refrigerant. This risk is even higher in the gas to gas heat exchanger, because foreign bodies are very often present in the compressed air, which likewise here are deposited in the horizontal condensing pipes or tubes 24 and not only increasingly impair the heat-transfer but can also lead to lumen reduction and an increase in pressure differential. A freeze drier so constructed must therefore be serviced at regular intervals in order to remove deposits. In addition, the overall height is excessive, despite the arrangement of the two heat-exchangers alongside one another, and this naturally again increases the required mounting space. If, as shown in our prior patent second aforementioned, a common housing is used both for the gas to gas heat exchanger and the gas to refrigerant heat exchanger, the compactness of the over-all installation is in fact improved for the same over-all height, yet otherwise this drier has the same disadvantages as the drier described already and described in our prior patent first aforementioned.

The freeze drier known from our prior patent second aforementioned is shown in FIGS. 2 and 3, components with the same function being given the same reference numerals as for the freeze drier shown in FIG. 1. The drier 10 comprises a vertically-mounted gas to gas heat exchanger 12 with a gas to refrigerant heat exchanger 14 parallel thereto. Within the gas to gas heat exchanger 12 there is a heat-exchanger insert 18 fitted with spiral condensing tubes or pipes 24.

The gas to be treated is passed to the gas to gas heat exchanger 12 through an inlet 18, the compressed air temperature being, for example, 35° C. The compressed air flows from the inlet into the spiral condensing tubes or pipes 24 from above downwards and is thereby cooled.

The gas emerges at 30 (FIG. 2), 30a, 30b (FIG. 3), and passes through filters 32a and 32b and a space 38 to the inlet to the gas to refrigerant heat exchanger 14.

The gas to refrigerant heat exchanger 14 also has a heat-exchanger insert 36 with spiral condensing pipes or tubes 46. The gas flowing into the gas to refrigerant heat exchanger 14, cooled to a temperature of, for example, 20° C., flows through the heat-exchanger insert 36, and leaves it at a temperature of +1.5° C.

Here also, moisture contained in the gas is precipitated by the temperature drop, and may be removed by means of outlets 57 and 58. The now dry gas passes out of the gas to refrigerant heat exchanger and is passed to a filter 56, where any dirt residues or oil particles not precipitated with the dew water or not held back by the preceding filter can be trapped. From this filter the cold gas then passes back to the gas to gas heat exchanger 12, where it is passed over spiral condensing tubes or pipes 24 upwards and out of the outlet 34. Thus this gas is again heated to a temperature suitable for use.

This known freeze drier thus also already uses the energy-saving return-flow principle, and, by means of using the natural gradient of the differently-temperatured gas components, also achieves a reduction in the throughflow resistance. However, a disadvantage is, as already discussed, the necessity for three filters in the gas circuit, and the complicated gas guidance, which allows the pressure drop still to remain too high.

The coolant passed through pipe 44 flows through the successively-located spiral condensing pipes or tubes 46 and emerges again through pipe 50. Both heat-exchangers and the three filters are housed in a pressure tank 16 which may be closed by a lid 17. This pressure tank fixes the rated output of the freeze drier, because it is impossible without altering the size of this tank to increase the rated output either by providing further heat-exchanger units or by providing larger heat-exchangers. Nor is it possible to reduce the rated output, such as could be appropriate, for example, for reasons of cost.

In order to enable interchange of filters 32a, 32b and 56, there is provided in the pressure tank wall 16 a nozzle connected to the lid. As it is necessary firstly to screw the lid off and by reaching through the resultant opening, to dismantle the individual filters and withdraw them from the casing, interchange of filters is extremely time-consuming. In addition, the filters need to be changed very often, as they are the main collection point for precipitated oil.

Figure 4:
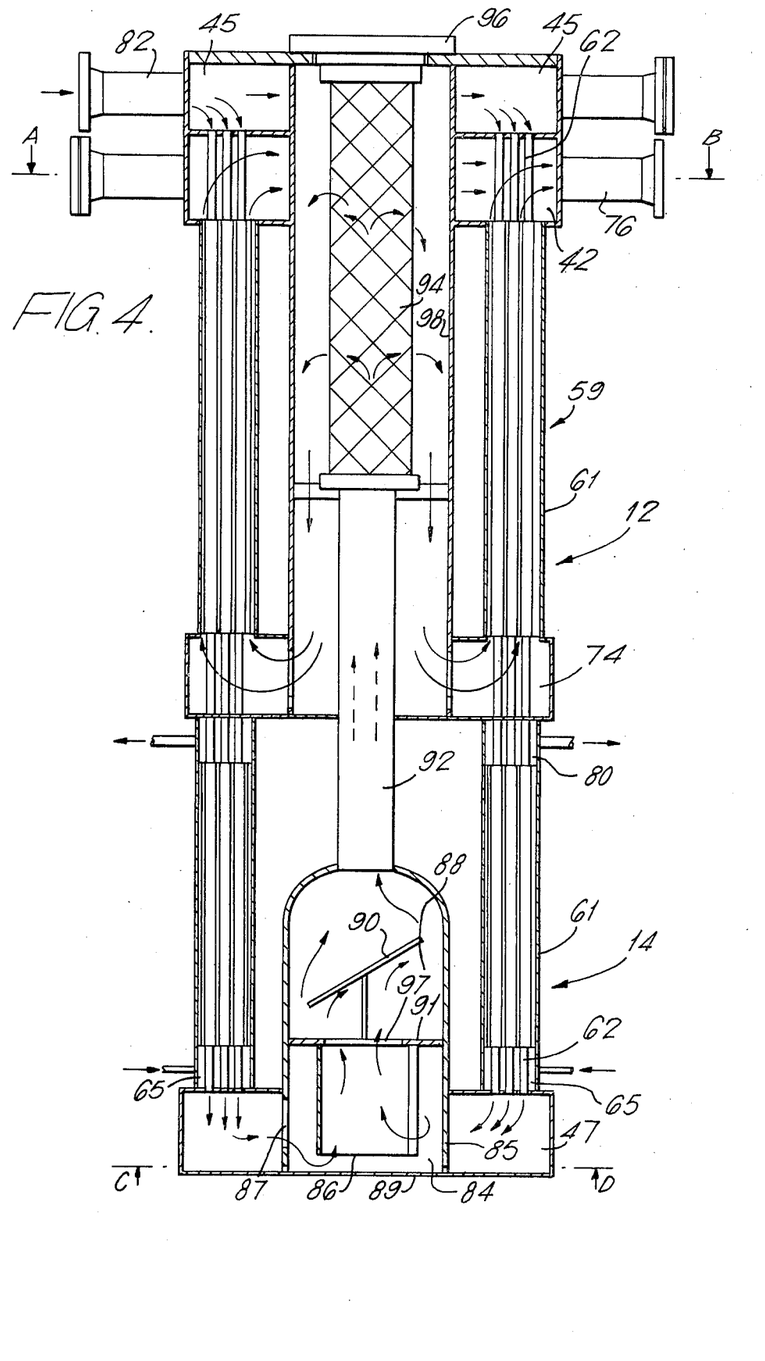
FIG. 4 is a cross-sectional view of an embodiment of the apparatus according to the invention, for freeze drying of a gas.
Figure 5:
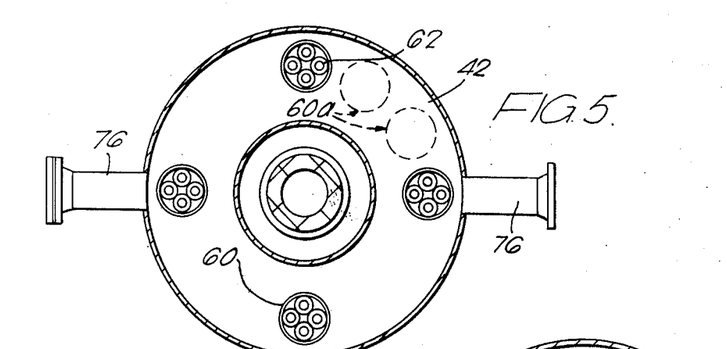
FIG. 5 is a sectional view along the line A–B of FIG. 4.

FIG. 4 shows a first embodiment of a freeze drier according to the invention improved in relation to the prior art hereinbefore described, the said drier being shown in longitudinal section, while FIG. 5 shows a cross-sectional view along the line A–B of FIG. 4. Here again the device for freeze drying of gas, like the prior art, consists of a gas to gas heat exchanger 12 and a gas to refrigerant heat exchanger 14. The two exchangers are located coaxially one above the other. This arrangement is particularly advantageous compared to the known arrangement shown in FIG. 1, because on the one hand it considerably reduces the base area of the exchanger, and on the other hand is move favourable in terms of flow, because the necessity for connecting pipelines between the two exchangers is partially eliminated.

Figures 6A, 6B, 6C, 6D, 6E:
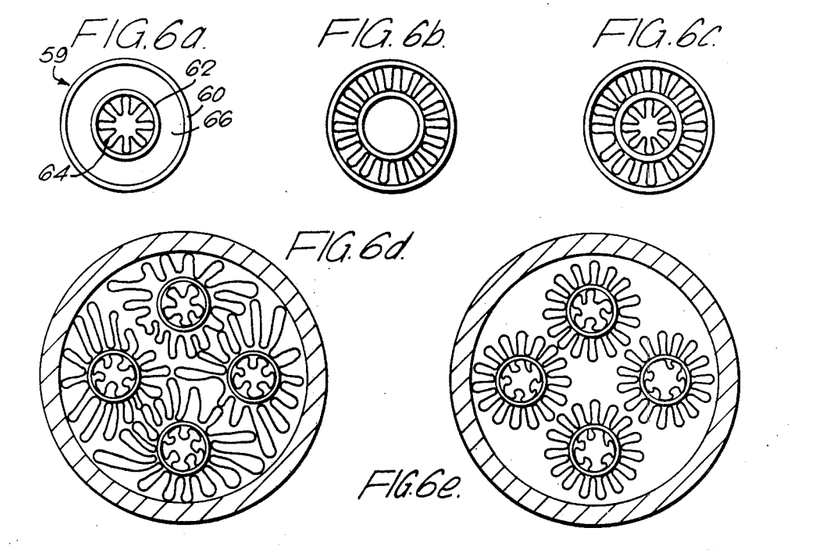
FIGS. 6a to 6e are sectional views of different embodiments of exchanger elements according to the invention.

The increase in over all height by locating the two heat-exchangers one above the other is kept within limits by using, at least in the gas to gas heat exchanger 12, exchanger elements which have particularly good heat-transfer properties. Examples of such heat-exchanger elements are shown in cross-section in FIGS. 6a to d. The simplest form of an exchanger element 59 is shown in FIG. 6a. In this case, the exchanger element 59 consists of an external tube 60 with an inner tube 62 located coaxially therewith, and also termed a core tube. Inserted into the core tube is a meanderingly-corrugated sheet metal strip 64, in heat-conducting contact with the inner wall of the core tube 62. This corrugated metal 64 increases the heat exchanger area within the core tube, for example by a factor of 10 to 15. Taking into consideration the influence of the long heat-conduction path, giving rise to a heat-transfer loss for example of a factor of 0.3 to 0.7, there still is an improvement in heat penetration of a factor in the present example of 3 to 10.5. Whereas a condensing pipe or tube length of, for example, 6 meters was hitherto necessary and could not be housed in a heat-exchanger tank without zig-zag or looped guidance, this improvement in the heat transfer makes it possible to shorten the condensing pipe or tube length to 2 meters or even to 60 cm, enabling these condensing pipes or tubes, as shown in FIG. 4, to pass in a straight line from an upper air inlet collector 45 through the gas to gas heat exchanger 12, then through the gas to refrigerant heat exchanger 14 to the lower air outlet collector 47. Thus, for example, the over-all structural height amounts to only 2 to 3 meters.

The profile shown in FIG. 6a is particularly suitable for a gas to refrigerant heat exchanger, in which the coolant flows through the lumen 66 formed by the core tube outer surface and the inner surface of the outer tube, where the gas to be cooled flows through the core tube 62. The larger heat exchanger surface formed within the core tube by the meandering corrugated metal is advantageous because the heat transfer from gas to metal is often worse than that between coolant and metal. Increase in the heat exchange surface area by a similar factor results in optimal adaptation of the heat exchanger to the heat-exchanger media.

Should the coolant flow through the core tube, while the gas flows through the lumen 66 formed by the core tube and the outer tube, it is appropriate to locate the meandering corrugated sheet in this lumen 66, as shown in FIG. 6b.

If a heat exchange between two gases is provided, such for example as in the gas to gas heat exchanger 12, meandering corrugated metal should be provided both within the core tube and also between the core tube and the outer tube, as shown in FIG. 6c.

As shown in FIG. 4 and also in FIG. 6d and 6e, it can be advantageous to locate several core tubes 62 within only one outer tube 60. In the embodiment shown in FIG. 4, this arrangement simplifies the connection of the upper air outlet collector 42 to the exchanger element 59 in this case containing four core tubes, because the upper air outlet collector 42 need only be connected to one lumen 66 per exchanger element 59. The simplification in the range of the gas to refrigerant heat exchanger is even greater, as otherwise every core tube would require its own injection system.

The embodiments of an exchange element shown in FIGS. 6d and 6e differ in that in FIG. 6e the meandering corrugated metal around each core tube 62 is located axially symmetrically to the core tube in question. If the lumen 66 is to be improved in order to increase the heat-exchange surface area per unit area of the lumen, it is appropriate according to FIG. 6d to form the corrugated metal in such a way that these free spaces disappear. This can be effected by drawing the tubes 60 shown in FIG. 6e, resulting in a diameter reduction, leading to compression of the corrugated metal around the individual core tubes, giving rise to the arrangement in FIG. 6e differing from that in FIG. 6d.

Figure 7A:
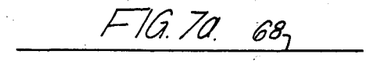
FIGS. 7a to 7e and 8a to 8d are schematic views illustrating the manufacturing method for exchanger elements according to the invention.

The exchanger elements shown in FIGS. 6a to 6e may be manufactured in various ways. For example, one may proceed from a planar sheet-metal strip, as shown schematically in FIG. 7a. This strip 68 may then be corrugated (FIG. 7b), and, after suitable winding, for example around a bar 70, may be inserted into core tube 62, whereupon the bar 70 is withdrawn.

Figure 7B:
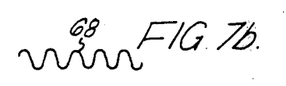
Figure 7C:
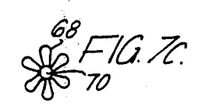
Figure 7D:
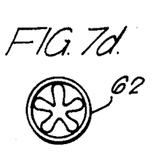
Figure 7E:
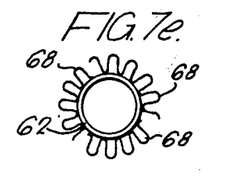

In order to insert corrugated metal into the lumen 66 between core tube 62 and outer tube 60, a corrugated strip according to FIG. 7b may be passed around the core tube 62 (FIG. 7e), and then this core tube, if necessary along with other core tubes, may be inserted into the outer tube 60. The corrugated sheet metal 68, in this space, may consist of several parts.

Figures 8A, 8B, 8C:
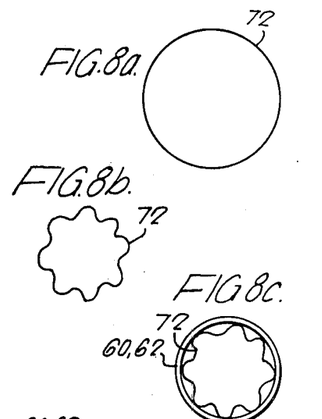
Figure 8D:
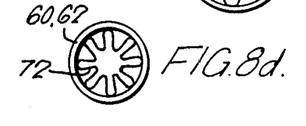

Instead of the method described above, in which one proceeds from a sheet-metal strip, it is also possible to proceed from a sheet-metal tube 72, see FIG. 8a. This tube may be provided with corrugation by a suitable method, e.g. by compression, as shown in FIG. 8b. The tube thus deformed is simply inserted into a corresponding core tube 62, or also into a corresponding outer tube 60, see FIG. 8c.

If, now, the tubes 60 or 62 are reduced in diameter by drawing, the corrugations in sheet-metal tube 72 deepen, while at the same time as a result of the pressure, good heat-transfer contact is produced between the corrugated metal and the tube wall. Instead of this, of course, the corrugated metal may also be connected in another way to the tube, for example by soldering or welding.

These exchanger elements constructed according to the invention enable the provision of particularly efficient contact devices for freeze drying. The embodiment shown in FIG. 4 has already been briefly described. The freeze drier shown in FIG. 4 will now be described in greater detail. The illustration is schematic and any parts, such as the foundation, a possibly existing outer casing and other securing devices have been omitted for reasons of simplicity. The apparatus consists of a gas to gas heat exchanger 12 and closely connected therewith a gas to refrigerant heat exchanger 14. This construction allows the same core tubes 62 to be provided both for gas to gas heat exchanger 12 and for gas to refrigerant heat exchanger 14. Thus any connecting pipes and collecting spaces otherwise required are eliminated, c.f. for example the known apparatus shown in FIG. 1. Thus not only is the flow resistance reduced, but also the structure of the drier may be simplified and rendered less expensive, as a part of the otherwise-required pressure-resistant collector and connecting pipes is omitted.

Around each of the core tubes 62 (c.f. FIG. 6d, 6e) there is located an external tube 60, through which cold air flows in the gas to gas heat exchanger 12 from a central air collector 74, from above downwards, to the upper air outlet collector 42, and from there via an outlet nozzle 76, leaves the drier as dried air at normal temperature. On the other hand, there flows through the lumen of the external tube 60 in the compass of the gas to refrigerant heat exchanger 14 a coolant, provided at a lower coolant collector, flowing from this point through the outer tube or tubes 60, being again collected and withdrawn at the upper coolant collector 80.

The gas to be dried is fed to the freeze drier through a nozzle 82 and first passes into the upper air inlet collector 45, shown in the form of an annular hollow box with a rectangular cross-section. The core tubes of the four external pipes 60 provided open on the base surface of this box (c.f. FIG. 5). The gas or compressed air flows out of the collector 45 into the core tubes 62, is pre-cooled by the dried and cold gas flowing in a contrary direction in the lumen of the external tube, and is brought to a temperature of approximately zero, e.g. 1.5° C. The air thus cooled passes along with condensed moisture into the lower air outlet collector 47, which has the same shape as the upper air inlet collector 45. During the entire cooling process, moisture is separated, and is either carried along with the gas in the form of droplets, or is deposited on the walls of the core tube or on the meandering metal strips contained therein, and runs slowly downwards, entering the collector 47, where it may be withdrawn by means of a condensate remover (not shown in detail).

The height of the gas to refrigerant heat exchanger 14 may be selected to be the same as that of the gas to gas heat exchanger 12, should this be appropriate for reasons of interchangeability of the individual exchangers. Because of the often higher heat-transfer value of the coolant, it is however suitable under certain circumstances to keep the height of the gas to refrigerant heat exchanger less than that of the gas to gas heat exchanger 12, as the over-all height of the drier can be reduced in this way.

The dry cold gas in the centre of the drier is now passed from the lower air outlet collector 47 to the middle air collector 74, which is connected to the lumen of the outer tube 60 of the gas to gas heat exchanger 12. The gas now flows, warming, upwards through this lumen, and emerges from the lumen again at the upper air outlet collector 42. The air, dried to normal temperature, then passes through the outlet 76 out of the cold drier and from that point is fed to its point of utilisation.

In the freeze drier shown in FIG. 4, several devices are provided in addition in the centre, further improving the function of the drier. This involves a cyclone separator 84 provided with a striker baffle apron 86, serving to catch carried larger water and oil droplets and to pass them downwards, c.f. also FIG. 14. The deceleration space formed by the cyclone separator consists of a roller-shaped casing, the axis of which coincides with that of the freeze drier. The circular casing jacket 85 encloses the cyclone separator 84 from the collector space 47, with the exception of an opening 87, through which the gas can enter from the collector space 47 into the cyclone separator 84. In this collector space part of the gas is obliged to move cyclonically in an arc from the outlet openings of the core tubes 62 to the inlet openings 86 of the cyclone separator 84, so that part of the material to be separated is already precipitated on the walls of the collector.

Figure 14:
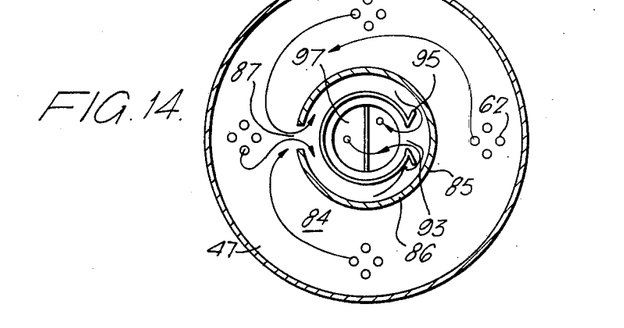
FIG. 14 is a sectional view along the line C–D of FIG. 4.

Within the cyclone separator casing, which also has a planar base surface 89, forming part of the base area of the freeze drier as such, is a cover surface 91, which separates the cyclone separator from a deceleration space 88 located above it. Attached to the cover surface 91 is the baffle apron 86, forming a wall extending close to the base surface and bent almost into a complete circle. The air entering the opening 87 into the cyclone separator is forced by this baffle apron 86 either to pass cyclonically around this plate in order to reach a slot 93 formed by the ends of the baffle apron 86 lying remote from the opening 87, or to pass into the inner space formed by the baffle apron, through the small slot formed therein between the baffle apron 86 and base surface 89. The ends forming the slot in the baffle apron may be suitably bent outwards, in order to form a further baffle surface 95.

From the cyclone separator, the gas passes through an opening 97 into the deceleration space 88 thereabove, in which the speed of the gas is reduced compared to that within the cyclone separator, so that droplets or particles carried along have an opportunity to be deposited on a further baffle plate 90 or on the outer walls of this deceleration space. The separation principle in the deceleration space is thus different from that in the cyclone separator, where the carried particles are brought against the outer walls for separation substantially by means of the centrifugal forces arising.

Connecting with the deceleration space 88 is the flue 92, which in this case is provided in the form of a tube with a diameter smaller than that of the deceleration space.

Depending on the selection of diameter for this tube, the speed of the upward-flowing gas may be influenced. Generally it is favourable to select as large a diameter as possible so that the speed of the upward-flowing gas is as low as possible and particles still leaving the deceleration space 88 still have an opportunity to drop downwards on to the baffle plate 90. This dropping motion will occur particularly if there is attached to the freeze drier an apparatus removing compressed air from the freeze drier only in a pulsating manner. During this pulsating removal, droplets or particles in the flue 92 are in fact drawn upwards, yet in the following phase, during which no compressed gas is removed, and thus no flow occurs within the flue 92, these particles have time to drop back in the flue downwards into the deceleration space and on to the baffle plate 90.

Drops of moisture and oil, leaving this flue 92 along with the airflow, are already of very small diameter. In this case the fine oil droplets arising in the compressor and having been "cracked" by the procedure taking place therein, and therefore valueless for lubrication purposes, are particularly damaging. They must therefore be kept away from the apparatus connected to the compressed-air drier. For this purpose there is provided a filter 94 at the end of the flue 92 in the compass of the freeze drier. This filter enables optimum separation of any residues of moisture, oil and dust still present. The filter 94 is simply interchangeable from above, e.g. after removal of a plate 96. The arrangement of the filter 94 shown is not only particularly advantageous from the point of view of interchange, but it also lies at the point with the coldest air. The oil to be separated is therefore at its most viscous at this point, and again has larger droplet diameter, because while flowing through the deceleration spaces and the flue 92, the droplets have had the chance to flow together. Thus it is possible to use filters with slightly larger mesh size than was previously the case. For example, a filter with a mesh size of $3\mu$ is used in order to trap oil droplets having a diameter of less than about 10 to $20\mu$.

The filter 94 is located in a filter casing 98, which at the same time acts as the return flow space for the gas leaving the filter cartridge 94. The now cleaned and dried gas flows out of this space 98 outside flue 92, downwards into the middle air collector 74, from where it passes in counterflow in the way described through the gas to gas heat exchanger, and passes out of the drier through the upper air outlet collector 42 and the outlet nozzle 76.

It should be noted that, within the gas to refrigerant heat exchanger, the principle of injection evaporation was selected, and not that of overflow evaporation, because the latter is on the one hand more suitable for horizontal evaporators, and on the other hand can only be regulated with a considerable degree of inertia. Rapid regulation, however, is useful, as in this way the compressed-air temperature can be brought considerably closer to 0° C., without the risk of icing.

Moreover, with the overflow evaporator, there is the risk of coolant separation, so that an agent would have to be used which does not separate so easily, but is less effective thermally.

Figure 10:
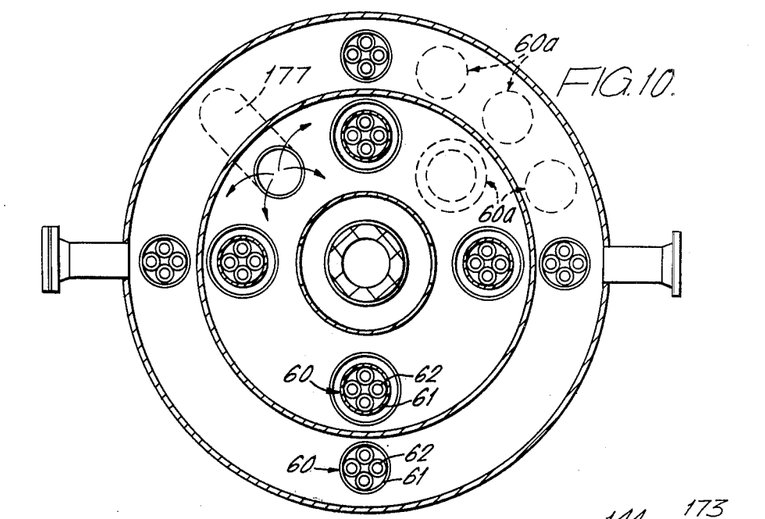
FIG. 10 is a sectional view along the line A–B of FIG. 9.
Figure 13:
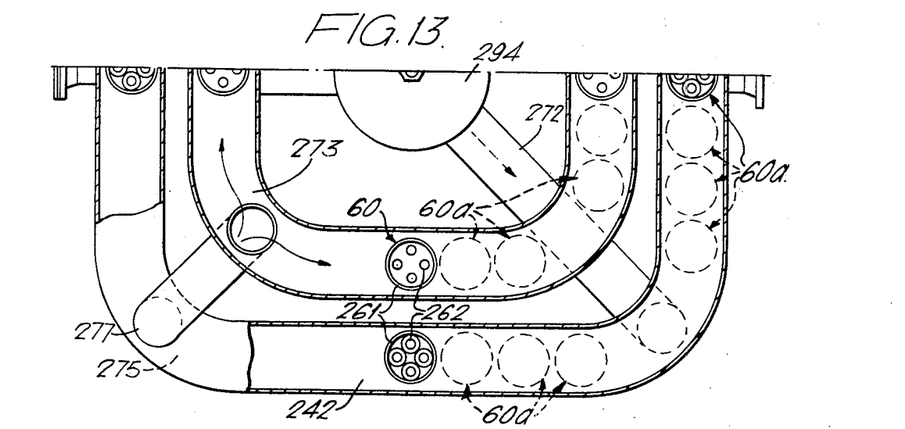
FIG. 13 is a sectional view along the line A–B of FIG. 12.

Instead of the arrangement shown in FIG. 5 of only four outer tubes 60, naturally further tubes 60a may be provided, depending on the required rated output (cf FIGS. 5, 10,13). In this way, with the same remaining construction, the rated output may be very accurately adapted to requirements, the external dimensions of the drier not changing, but the manufacturing costs being correspondingly adapted.

Figure 9:
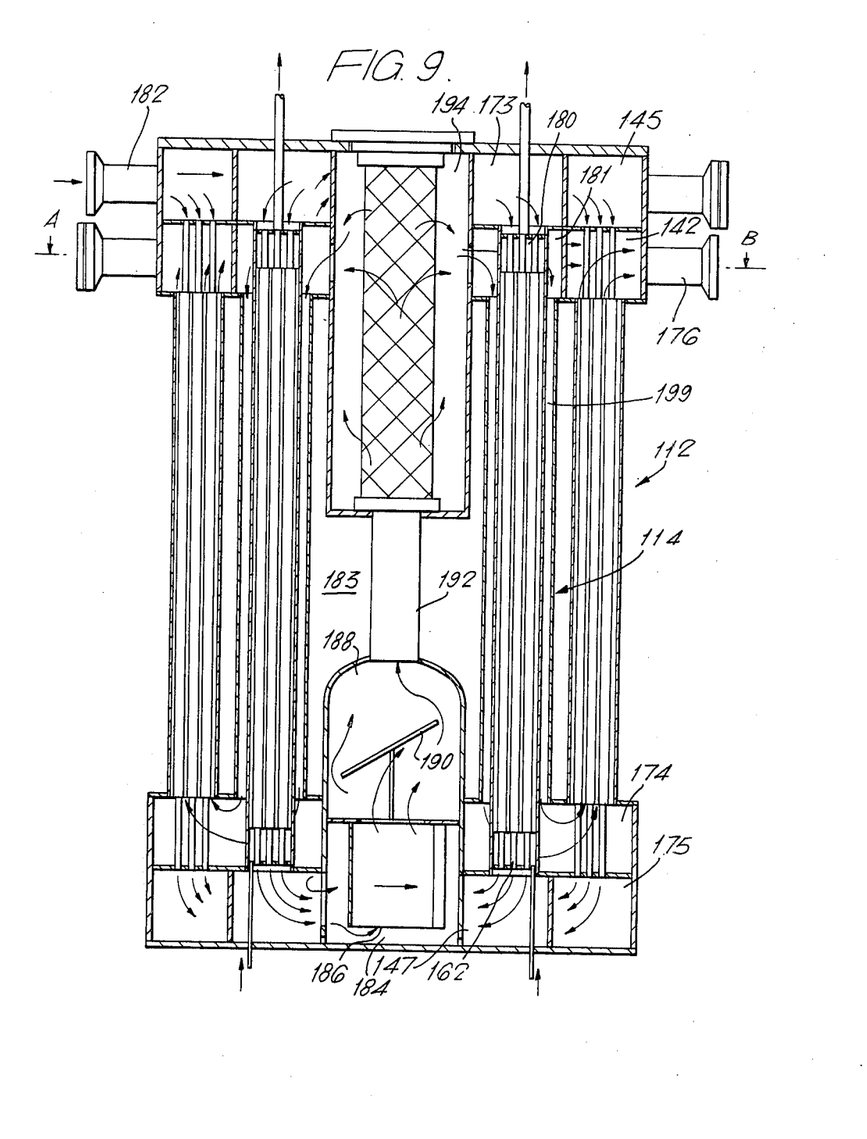
FIG. 9 is a further embodiment of the device according to the invention, for freeze drying of gas.

FIG. 9 shows a further embodiment of the drier according to the invention, in which the gas to gas heat exchanger 112 and gas to refrigerant heat exchanger 114 are arranged coaxially one within the ofther. The embodiment here shown corresponds in many parts to that shown in FIG. 4. In order to simplify the description, corresponding parts have been given the same reference numerals with a preceding "1".

Figure 11:
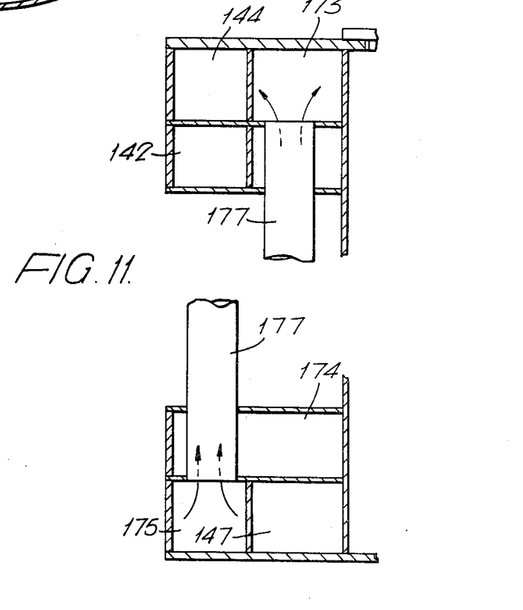
FIG. 11 is a partial sectional view rotated through 45° relative to FIG. 9, illustrating the tube connection between lower and upper annular pipes.

The insertion one into another of the two heat-exchangers enables the over-all height of the apparatus to be reduced even further. This reduction in height however requires additional measures in order to collect the pre-cooled gas emerging from the gas to gas heat exchanger, this being effected in an additional collecting space 175, then a tube 177, extending upwards from this collector space, and opening into the collector space 173, which connects with the core tubes of the gas to refrigerant heat exchanger 114 (c.f. also FIG. 11). The pre-cooled gas flows from here (in contrast to FIG. 4), i.e. from this collector 180 now lying at the upper end of the freeze drier, into the core tubes of the gas to refrigerant heat exchanger 114, and then pours into the lower air outlet collector 147, where it has reached its lowest temperature of about 1.5° C. Separated liquid collects both in the collector 175 and also in collector 147, and can be withdrawn from these points. The gas could now be passed from collector space 147 and space 174, in order to warm up again as it rises through the gas to gas heat exchanger, and then emerge through collector 142 and nozzle 176. However, in order to improve the water, oil and dirt separation, as in the embodiment in FIG. 4, there may be provided in the centre of the freeze drier once again a cyclone separator 184, a baffle apron 186, a deceleration space 188 with a baffle plate 190, a connecting flue 192 and finally also again a filter arrangement 194. Now the compressed air purified of small oil droplets, could be passed from the filter, as in the embodiment in FIG. 4, back into a space 183 lying around the flue, to the collector 174. However, it has proved suitable, instead of this, to locate around the outer tubes of the gas to refrigerant heat exchanger, a further tube 199, whose lumen connects with a collector 181, which in turn connects with the filter 194. The lumen of tube 199, through which the now cooled to the maximum gas, flows again downwards into the collector 174, serves for heat insulation of the gas to refrigerant heat exchanger from the adjacent gas to gas heat exchanger.

In this embodiment, the coolant is passed from below through collector space 162, and after collection in space 180, is withdrawn through a corresponding pipe at the upper end of the drier.

In FIG. 10, in turn, only four external tubes for each heat-exchanger 60 are shown extended. Naturally, here also a smaller or larger number of such exchanger elements may be provided, as shown in dotted lines at 60a. It should be noted that, because of the connector pipe 177, the entire periphery of each heat-exchanger ring for the arrangement of exchanger elements is not usable.

Figure 12:
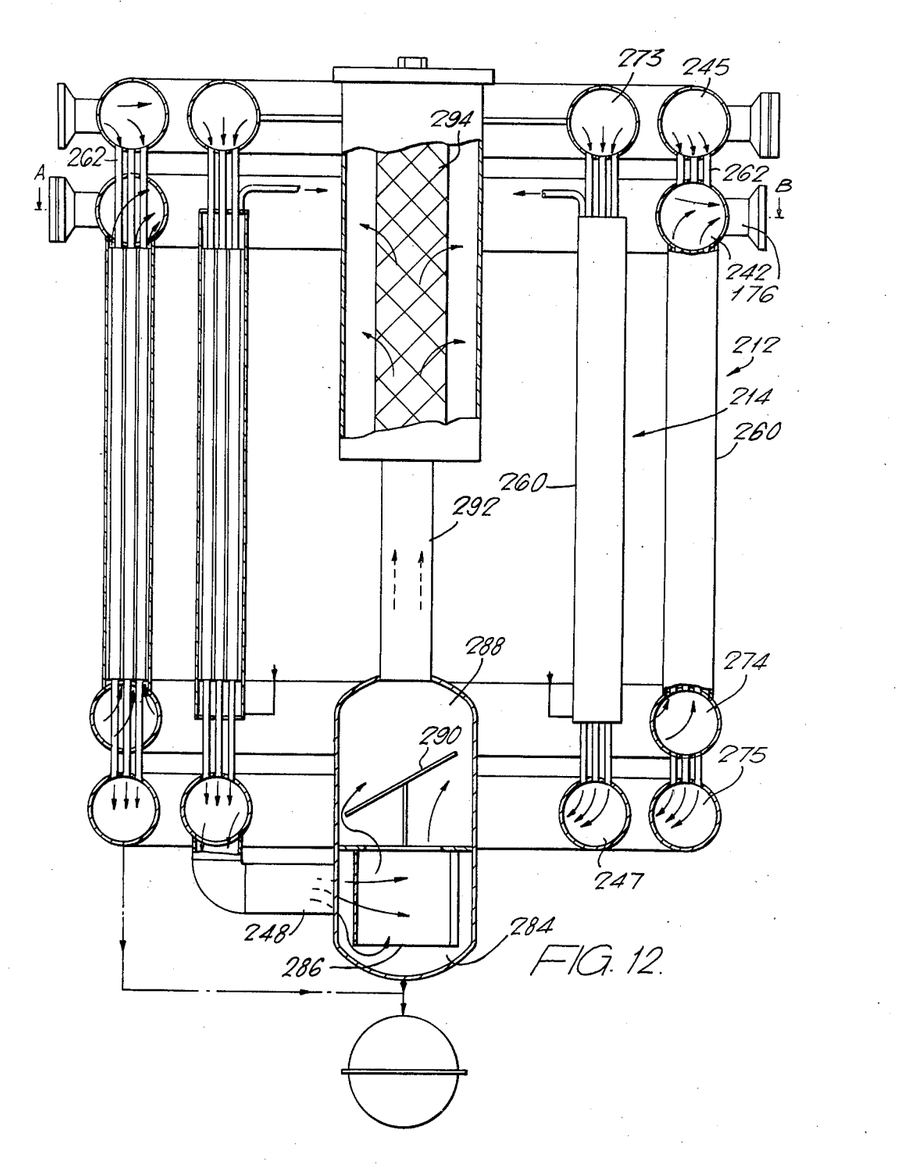
FIG. 12 is a further embodiment of the freeze drier for gas according to the invention.

FIGS. 12 and 13 show a third embodiment of the apparatus according to the invention for the freeze drying of gas, particularly compressed air. Here also a gas to gas heat exchanger 212 and a gas to refrigerant heat exchanger 214 are inserted coaxially one into the other. Instead of the annular collector spaces with rectangular cross-section, this embodiment however comprises pipelines so that this arrangement has a particular resistance to pressure. Thus the gas for drying is passed through nozzle 282 into a collector tube 244, to which the core tubes 262 of the gas to gas heat exchanger 212 are soldered or welded. Instead of the collector space 174, there is a collector pipeline 274, in order to introduce the cleaned cold gas flowing upwards in counterflow into the lumen of the outer tube 260 of the gas to gas heat exchanger, from which point, after flowing through the exchanger, it is collected in collector tube 242, and passed to the outlet 276. Instead of the collector space 175, likewise a collector tube 275 for receiving the pre-cooled gas, is provided. This pre-cooled gas then passes through an upward-leading pipe 277 into the pipeline 273 corresponding to collector space 173. From this point the core tubes of the gas to refrigerant heat exchanger 214 are supplied, opening into a lower collector tube 247 which connects with a cyclone separator 284 likewise provided here, through a tube 248. The cyclone separator 284 differs from that (184) shown in FIG. 9 only in that the lower wall is domed in order to increase the resistance to pressure. The casing of the cyclone separator, in addition to the baffle apron 286, also contains the deceleration space 288 and the baffle plate 290. From here the gas again passes through a flue into a filter 294 and from there through an additional pipe 272 into collector ring 274. From this collector ring, which connects with the lumen of the outer tube of the gas to gas heat exchanger 212, the gas passes, warming up, to the already mentioned collector ring 242, passing through outlet 276 to the point of utilisation. No particular pressure-resistant collector pipes are provided for the supply of coolant, as the coolant circuit does not have so high a pressure as the compressed-air circuit.

By means of this tubular construction, the size of the volume occupied by the gas within the compressed-air drier is reduced, so that the so-called pressure-volume product is modified and the inspection requirements are correspondingly reduced. In fact, the last-described embodiment, apart from the cyclone separator provided only as required and the filter, does not have a pressure tank shape, but merely tubes. To this extent, this represents a "non-tank" type of compressed-air drier.

We claim:

1. Apparatus for freeze drying of gas, particularly compressed air, comprising a gas to gas heat exchanger and a gas to refrigerant heat exchanger each in a substantially vertical arrangement, each exchanger having a first and a second volume in heat exchange relationship but without fluid communication with each other and each volume having an upper portion and a lower portion, the gas to gas heat exchanger having an inlet to a first header for warm gas to be dried, the first header being in fluid communication with the upper portion of the first volume, a first connection for fluid communication with the lower portion of the first volume, a second header for cooled gas, the second header being in fluid communication with the lower portion of the second volume, and an outlet from a third header for warm dried gas, the third header being in fluid communication with the upper portion of the second volume, the gas to refrigerant heat exchanger having a first connection for cool gas to be dried, the first connection being in fluid communication with the upper portion of the first volume of the gas to refrigerant heat exchanger, a second connection for dried cooled gas, the second connection being in fluid communication with the lower portion of the first volume, an inlet for refrigerant, the inlet being in fluid communication with the lower portion of the second volume, and an outlet for refrigerant, the outlet being in fluid communication with the upper portion of the second volume, the first header of the gas to gas heat exchanger being in fluid communication with the first connection of the gas to refrigerant heat exchanger being in fluid communication with the second header of the gas to gas heat exchanger, at least the gas to gas heat exchanger having exchanger elements which consist of an outer pipe and an inner core pipe located therein, and means including metal sheet meander-shaped in cross-section being arranged in heat contact with at least one of the outer pipe and the inner core pipe for increasing heat transfer.

2. Apparatus according to claim 1, in which the exchanger elements extend substantially vertically.

3. Apparatus according to claim 1, in which the exchanger elements extend with a twist of 0.2 to 2 revolutions per meter difference in level.

4. Apparatus according to claim 3, in which the exchanger elements extend with a twist of 0.5 to 1 revolutions per meter difference in level.

5. Apparatus according to claim 1, in which the ribbing consisting of sheet metal extending in a meander-shape is provided only in the gas circuit and not in the refrigerant circuit.

6. Apparatus according to claim 1, in which the gas to refrigerant heat exchanger and the gas to gas heat exchanger are disposed coaxially to one another.

7. Apparatus according to claim 6, in which the gas to gas heat exchanger lies above the gas to refrigerant exchanger.

8. Apparatus according to claim 6, in which the gas to refrigerant heat exchanger lies within the gas to gas heat exchanger.

9. Apparatus according to claim 7, in which the overall height of the gas to refrigerant heat exchanger is less than that of the gas to gas heat exchanger.

10. Apparatus according to claim 8, in which the ribs of the gas to refrigerant heat exchanger are smaller in number or in surface area than the ribs of the gas to gas exchanger.

11. Apparatus according to claim 1, in which several exchanger elements are located adjacent to one another in the heat exchangers.

12. Apparatus according to claim 11, in which the axes of the exchanger elements each lie on a continuously-extending closed curve.

13. Apparatus according to claim 12, in which the curve is a circle.

14. Apparatus according to claim 11, including a wall located coaxially about and spaced from the gas to refrigerant heat exchanger elements to form a secondary cooling circuit through which is passed the gas emerging from the gas to refrigerant exchanger before it flows through the gas to gas heat exchanger.

15. Apparatus according to claim 1, in which the exchanger elements terminate in a chamber common thereto.

16. Apparatus according to claim 15, in which the chamber is an annular pipe.

17. Apparatus according to claim 1, in that the exchanger element consists of several core pipes located in an outer pipe.

18. Apparatus according to claim 17 in which corrugated sheet metal is arranged symmetrically around each core pipe.

19. Apparatus according to claim 17, in which corrugated sheet metal is pressed together around the core pipes in such a way that substantially no space remains free of corrugated sheet metal in the lumen of the outer pipe.

20. Apparatus according to claim 17, in which corrugated sheet metal is located in the core pipes.

21. Apparatus for freeze drying of gas, particularly compressed air, comprising a gas to gas heat exchanger and a gas to refrigerant heat exchanger, means included therewith and so arranged that the gas to be dried flows in succession through the gas to gas heat exchanger, the gas to refrigerant heat exchanger and again through the gas to gas heat exchanger in a continuous circuit, the apparatus including a filter for separating out impurities contained in the gas, the heat exchangers and the filter forming a compact constructive unit, and the gas to gas heat exchanger and the gas to refrigerant heat exchanger forming a column with a flue-like space in the centre of said column, the upper end of said flue being occupied by the filter.

22. Apparatus according to claim 21, in which the lower end of the flue is occupied by a baffleplate separator to which the gas emerging from the gas to refrigerant heat exchanger is passed.

23. Apparatus according to claim 22, in which a cyclone separator is in series with the baffleplate separator.

24. Apparatus according to claim 21, in which the heat exchangers are mounted coaxially one above the other, the lower part of the flue is formed by the gas to refrigerant heat exchanger, and the upper part of the flue is formed by the gas to gas heat exchanger.

25. Apparatus according to claim 24, in which a space for return of the gas emerging from the filter to the return flow inlet of the gas to gas heat exchanger is formed between the outer wall of the flue and the inner wall of the exchanger within the compass of the gas to gas heat exchanger.

26. Apparatus according to claim 21, in which the gas to refrigerant heat exchanger lies coaxially within the gas to gas heat exchanger and its inner wall forms the flue.

27. Apparatus according to claim 26, in which a space is formed all around the gas to refrigerant heat exchanger and serves for return to the return-flow inlet of the gas to gas heat exchanger of the gas emerging from the filter.

28. Apparatus according to claim 21, in which the ends of the flue form the entry to the separator and the outlet from the filter and communicate by way of annular spaces with the individual elements of the heat-exchanger.

29. Apparatus according to claim 21, in which the filter comprises a filter cartridge which can be inserted from above into a filter space.

30. Apparatus according to claim 21, in which the flue is formed by a separate tube lying within the inner walls of the heat-exchanger.

31. Apparatus according to claim 29, in which the filter cartridge is a fine-mesh filter with a mesh size of about $20\mu$.

32. Apparatus according to claim 29, in which the filter cartridge is a fine-mesh filter with a mesh size of about $3\mu$.

33. Apparatus according to claim 29, in which the filter cartridge is a fine-mesh filter with a mesh size of about $0.05\mu$.

34. Apparatus for freeze drying of compressed gas, particularly compressed air, comprising a gas to gas heat exchanger and a gas to refrigerant heat exchanger in a substantially vertical arrangement and including means so arranged that the gas to be dried successively flows through the gas to gas heat exchanger, the gas to refrigerant heat exchanger and again through the gas to gas heat exchanger in a continuous circuit, the gas to gas heat exchanger and the gas to refrigeration heat exchanger being disposed coaxially to one another and being constructed from exchanger elements which have a tube-in-tube structure and terminate in annular collector spaces of small cross-section.

35. Apparatus according to claim 34, in which the gas to refrigerant heat exchanger and the gas to gas heat exchanger are arranged one above the other in such a way that the inner tubes pass through both exchangers without interruption.

36. Apparatus according to claim 34, in which several inner tubes lie within an outer tube.

37. Apparatus according to claim 34, in which a separator tubular in form is arranged in the centre of the heat-exchangers.

38. Apparatus according to claim 34, in which the heat-exchangers are located one within the other in order to reduce the drier volume.

39. Apparatus according to claim 34 in which the connections between the individual elements of the drier, such as annular spaces, separators, filters, inlet and outlet, are formed by pipe lines.

40. Apparatus according to claim 34 in which the annular pipes have the same cross-section.

41. Apparatus according to claim 34, in which any separators and filters present are constructed as small pressure-containers the volumetric capacity of which is as small as possible.

42. Apparatus for freeze drying of gas, particularly compressed air, comprising a gas to gas heat exchanger and a gas to refrigerant heat exchanger in a substantially vertical arrangement including means such that the gas to be dried successively flows through the gas to gas heat exchanger, the gas to refrigerant heat exchanger and again through the gas to gas heat exchanger in a continuous circuit, the heat-exchangers each consisting of several identical substantially vertical exchanger elements the axes of which lie on one closed curve or several closed curves coaxial with one another.

43. Apparatus according to claim 42, in which the axes of the gas to gas heat exchanger and the gas to refrigerant heat exchanger each lie on only one closed curve.

44. Apparatus according to claim 43, in which the curves are circles.

45. Apparatus according to claim 42 in which the gas to gas heat exchanger and the gas to refrigerant heat exchanger are located one above the other, and at least some exchanger elements of the gas to gas heat exchanger lie coaxial with corresponding exchanger elements of the gas to refrigerant heat exchanger.

46. Apparatus according to claim 42, in which the exchanger elements each lying on a closed curve, are uniformly spaced apart.

47. Apparatus according to claim 42, in which the exchanger elements, each lying on a closed curve, are connected at their ends in each case with two collector pipes which have substantially the shape of the closed curve, one collector pipe being provided for one exchanger medium, and the second collector pipe for the second exchanger medium, and that said components form an exchanger module.

48. Apparatus according to claim 47, in which the four collector pipes of the exchanger module each have a connector nozzle through which a connection can be established with other modules and/or separators, filters, inlets and outlets of the freeze drier.

49. Apparatus according to claim 42, in which the diameter of the closed curves of the modules are so selected that the modules may be located one within the other.

50. Apparatus according to claim 1, characterized in that the gas to gas heat exchanger is above the gas to refrigerant heat exchanger, that the exchangers are coaxial to one another, and that the first connection of the gas to gas heat exchanger and the first connection of the gas to refrigerant heat exchanger is provided by the uninterrupted extension of the inner core pipe of the gas to gas heat exchanger to the inner core pipe of the gas to refrigerant heat exchanger.

* * * * *